Jan. 6, 1931.  R. S. SANFORD  1,787,494
BRAKE
Filed Sept. 29, 1927

INVENTOR
ROY S. SANFORD
BY
*M. W. McConkey*
ATTORNEY

Patented Jan. 6, 1931

1,787,494

UNITED STATES PATENT OFFICE

ROY S. SANFORD, OF SOUTH BEND, INDIANA, ASSIGNOR TO BENDIX BRAKE COMPANY, OF CHICAGO, ILLINOIS, A CORPORATION OF ILLINOIS

BRAKE

Application filed September 29, 1927. Serial No. 222,722.

This invention relates to brakes and is illustrated as embodied in an internal expanding brake for an automobile. An object of the invention is to provide novel brake-operating means including anti-friction rollers carried by the brake shoes or their equivalents and which are preferably in the form of drawn steel stampings having substantially cylindrical flanges for engagement with the cam or other applying device, and, if desired, also having drawn cylindrical central flanges forming bearings to be mounted on a pivot member. I prefer to arrange the rollers in pairs on opposite sides of the web of the shoe and to operate the shoe by a cam engaging the pair of rollers and formed with a rib projecting between them to position the shoe laterally.

The above and other objects and features of the invention, including various novel and desirable details of construction, will be apparent from the following description of the illustrative embodiments shown in the accompanying drawings, in which.

Figure 1:
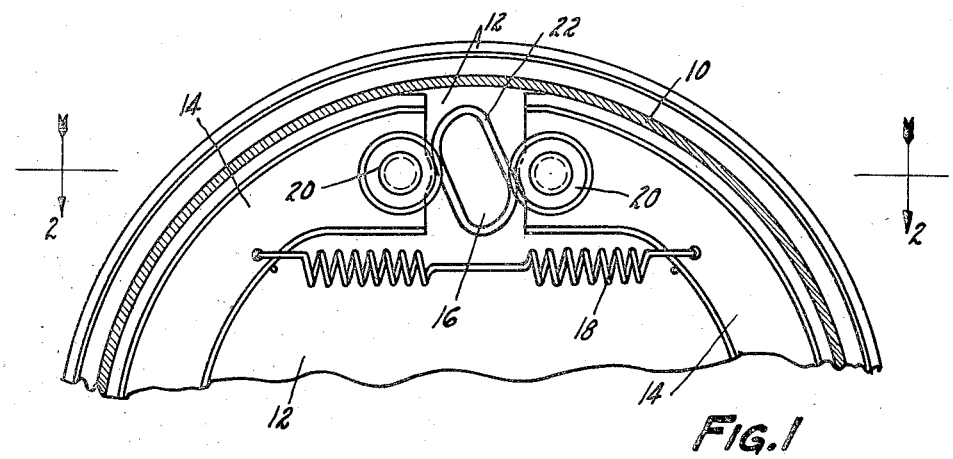
Figure 1 is a vertical section through the upper part of the brake just inside the head of the brake drum and showing the upper ends of the brake shoes in side elevation.

In the arrangement illustrated the brake includes a rotatable drum 10 at the open side of which is arranged a suitable support such as a backing plate 12, and within which are arranged shoes 14 or equivalent friction means which are forced against the drum to apply the brake by means such as a cam acting against the resistance of a return spring 18. The particular brake illustrated in the drawing is substantially as more fully described in Patent No. 1,567,716, granted Bendix Brake Company on December 29, 1925, on an application of A. Y. Dodge.

Figure 2:
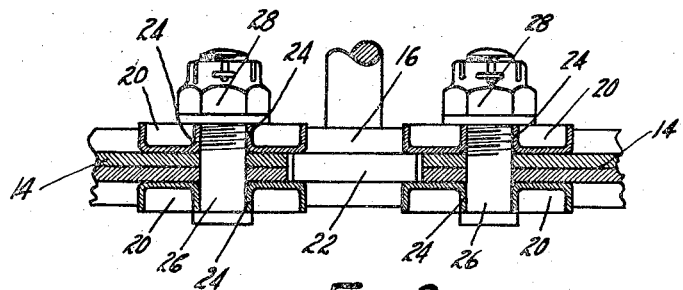
Figure 2 is a partial section on the line 2—2 of Figure 1 and showing the mounting of the rollers.

In the arrangement of Figures 1 and 2, cam 16 or its equivalent acts on rollers 20 carried by the ends of the shoes and which are preferably arranged in pairs, the cam 16 being provided with a rib 22 which projects between the rollers of each pair to position the end of the shoe laterally. Each of the rollers is illustrated as formed as a stamping drawn from steel or other metal and having a substantially cylindrical outer flange which is engaged by the cam 16. I prefer to form the rollers with central cylindrical flanges 24 journalled on pivots which are illustrated as being bolts 26 passing through the ends of the webs of the shoes 14. Means such as a castellated nut 28 on the end of each of the pivots 26 confines the entire assembly in place.

Figure 3:
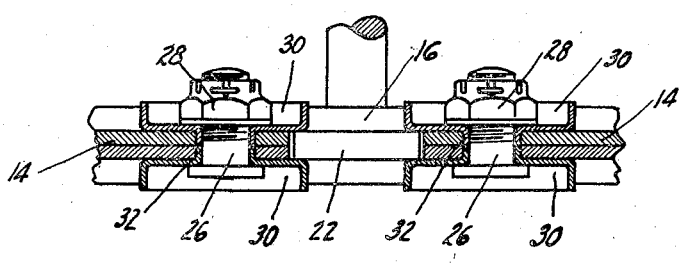
Figure 3 is a view corresponding to Figure 2 but showing a different form of roller.

The arrangement in Figure 3 is substantially as described above except that the rollers 30, which correspond to the rollers 20, are formed with their central flanges 32 turned in the opposite direction from the outer flanges. The flanges 32 on each pair of rollers 30 thus form a bushing in the web of the shoe 14 through which the pivot 26 passes.

While two illustrative embodiments have been described in detail, it is not my intention to limit the scope of the invention to those particular embodiments or otherwise than by the terms of the appended claims.

I claim:

1. A brake shoe having an opening in one end thereof together with an anti-friction roller having a central tubular flange nested within said opening.

2. A brake shoe having an opening in one end thereof together with an anti-friction roller having a central tubular flange nested within said opening and further provided with a cylindrical external cam-engaging flange.

3. A brake shoe having an opening in one end thereof and further provided with a two part anti-friction means comprising rollers having abutting central tubular flanges nesting within said opening.

4. An anti-friction roller comprising a laterally extending flange at its outer periphery and an oppositely extending laterally directed central tubular flange.

In testimony whereof, I have hereunto signed my name.

ROY S. SANFORD.